US011942255B2

(12) United States Patent
Tominaga et al.

(10) Patent No.: US 11,942,255 B2
(45) Date of Patent: Mar. 26, 2024

(54) INDUCTOR COMPONENT

(71) Applicant: Murata Manufacturing Co., Ltd., Kyoto-fu (JP)

(72) Inventors: Ryuichiro Tominaga, Nagaokakyo (JP); Koichi Yamaguchi, Nagaokakyo (JP); Akinori Hamada, Nagaokakyo (JP); Isamu Miyake, Nagaokakyo (JP); Shinya Hirai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 523 days.

(21) Appl. No.: 17/002,604

(22) Filed: Aug. 25, 2020

(65) Prior Publication Data

US 2021/0090781 A1 Mar. 25, 2021

(30) Foreign Application Priority Data

Sep. 25, 2019 (JP) ................................ 2019-174479

(51) Int. Cl.
*H01F 5/00* (2006.01)
*H01F 27/255* (2006.01)
*H01F 27/28* (2006.01)
*H01F 27/32* (2006.01)
*H01F 41/02* (2006.01)
*H01F 41/04* (2006.01)
*H01F 41/12* (2006.01)

(52) U.S. Cl.
CPC ....... *H01F 27/2804* (2013.01); *H01F 27/255* (2013.01); *H01F 27/32* (2013.01); *H01F 41/0246* (2013.01); *H01F 41/041* (2013.01); *H01F 41/12* (2013.01)

(58) Field of Classification Search
CPC .................................................. H01F 27/2804
USPC .......................................................... 336/200
See application file for complete search history.

(56) References Cited

U.S. PATENT DOCUMENTS

2014/0360756 A1 12/2014 Honda et al.
2016/0307663 A1* 10/2016 Ikeda ..................... H01B 3/306
2017/0294249 A1* 10/2017 Oya ......................... H02K 3/30
2018/0041087 A1 2/2018 Hayashizaka et al.
(Continued)

FOREIGN PATENT DOCUMENTS

CN 203931551 U 11/2014
CN 107210636 A 9/2017
(Continued)

*Primary Examiner* — Ronald Hinson
(74) *Attorney, Agent, or Firm* — Studebaker & Brackett PC

(57) ABSTRACT

An inductor component includes an element body including a magnetic layer containing a resin and a magnetic powder; a coil wiring line arranged inside the element body; and an insulating coating film covering the coil wiring line and not including a magnetic material. In a cross section perpendicular to an extension direction of the coil wiring line, a top surface thickness of a part of the insulating coating film covering the top surface of the coil wiring line and a side surface thickness of parts of the insulating coating film covering side surfaces of the coil wiring line are less than or equal to 10 μm, and a corner thickness of parts of the insulating coating film that cover corners of the coil wiring line interposed between the top surface and the side surfaces is at least half of the top surface thickness and/or the side surface thickness.

20 Claims, 6 Drawing Sheets

(56) References Cited

U.S. PATENT DOCUMENTS

| | | | | |
|---|---|---|---|---|
| 2019/0206611 | A1* | 7/2019 | Matsumoto | H01F 17/04 |
| 2019/0244743 | A1 | 8/2019 | Hirai et al. | |

FOREIGN PATENT DOCUMENTS

| | | | |
|---|---|---|---|
| CN | 109643598 | A | 4/2019 |
| CN | 110136921 | A | 8/2019 |
| JP | 2001-060745 | A | 3/2001 |
| JP | 2014-032978 | A | 2/2014 |
| JP | 2014-238927 | A | 12/2014 |
| JP | 2019-121780 | A | 7/2019 |
| JP | 2019-134141 | A | 8/2019 |
| JP | 2019-161152 | A | 9/2019 |
| WO | 2018/057227 | A1 | 3/2018 |

* cited by examiner

INDUCTOR COMPONENT

CROSS-REFERENCE TO RELATED APPLICATION

This application claims benefit of priority to Japanese Patent Application No. 2019-174479, filed Sep. 25, 2019, the entire content of which is incorporated herein by reference.

BACKGROUND

Technical Field

The present disclosure relates to an inductor component.

Background Art

Japanese Unexamined Patent Application Publication No. 2014-32978 discloses an inductor component of the related art. The inductor component includes a support layer, a first coil wiring line that is provided on the support layer, a magnetic layer that covers part of the first coil wiring line, an insulating resin layer that covers the support layer, the first coil wiring line, and the magnetic layer, and a second coil wiring line that is provided on the insulating resin layer.

A problem was discovered in that when the thickness of the insulating resin layer is reduced in order to improve the characteristics of the inductor component of the related art, it is not possible to make the thickness of the insulating resin layer that covers the top surface and the side surfaces of the coil wiring line less than or equal to 10 μm. This is because the insulating resin layer in the example of the related art is formed by stacking resin such as epoxy resin on the first coil wiring line by performing pressing so that the resin sufficiently fills the spaces between the lines of the first coil wiring line while at the same time covering the entire top surface of the first coil wiring line and so that the resin forms an interlayer thickness between the first coil wiring line and the second coil wiring line, and therefore it is very difficult to make the thickness of the insulating resin layer less than or equal to 10 μm when the press stacking is performed. In addition, although it is possible to process the side surfaces of the insulating resin layer after the press stacking using photolithography or a laser, the processing accuracy is a rate limiting factor and it is very difficult to form an insulating resin layer having a small side surface thickness of 10 μm or less. Therefore, the inventors of the present application attempted to reduce the thickness of the insulating resin layer by using an insulation electrodeposition technique and were successful in forming an insulating coating film in which the thickness of the insulating resin layer covering the top surface and side surfaces of the coil wiring line was 10 μm or less. However, the inventors found that the coil wiring line may become exposed from the insulating coating film in this case.

SUMMARY

Accordingly, the present disclosure provides an inductor component that can suppress a situation in which a coil wiring line becomes exposed from an insulating coating film.

An inductor component of a preferred embodiment of the present disclosure includes an element body including a magnetic layer that includes a magnetic powder and a resin that contains the magnetic powder; a coil wiring line that is arranged inside the element body; and an insulating coating film that covers the coil wiring line and does not contain a magnetic material.

In a cross section that is perpendicular to a direction in which the coil wiring line extends, a top surface thickness of a part of the insulating coating film that covers a top surface of the coil wiring line and a side surface thickness of parts of the insulating coating film that cover side surfaces of the coil wiring line are less than or equal to 10 μm, and a corner thickness of parts of the insulating coating film that cover corners of the coil wiring line interposed between the top surface and the side surfaces of the coil wiring line is greater than or equal to half of at least one out of the top surface thickness and the side surface thickness.

Here, "thickness" refers to the minimum thickness and "top surface" refers to a surface that faces upwards in the stacking direction of layers of the inductor component.

In this case, since the top surface thickness and the side surface thickness of the insulating coating film are less than or equal to 10 μm, the inductor component can be reduced in size or the inductance of the inductor component can be improved by increasing the size of the region occupied by the magnetic layer.

Furthermore, since the corner thickness of the insulating coating film is greater than or equal to half of at least one out of the top surface thickness and the side surface thickness, the difference between the corner thickness and at least one out of the top surface thickness and the side surface thickness can be reduced, and as a result the situation in which the parts of the insulating coating film covering the corners of the coil wiring line become thinner due to the surface tension generated during heat curing shrinkage and the corners of the coil wiring line end up becoming exposed from the insulating coating film can be suppressed.

In addition, in the inductor component, the corner thickness may be greater than or equal to half of the smaller thickness out of the top surface thickness and the side surface thickness.

In this case, the thickness of the insulating coating film can be made even smaller.

In addition, in the inductor component, the corner thickness may be smaller than the larger thickness out of the top surface thickness and the side surface thickness.

In this case, there is no need to make the corner thickness excessively large and the inductor component can be efficiently manufactured.

Furthermore, in the inductor component, the corners may be each substantially shaped like a chamfered surface.

In this case, it is easy to realize a structure in which the corner thickness is greater than or equal to half of at least one out of the top surface thickness and the side surface thickness.

Furthermore, in the inductor component, the corners may be each substantially shaped like a convexly-curved surface.

In this case, it is easy to realize a structure in which the corner thickness is greater than or equal to half of at least one out of the top surface thickness and the side surface thickness.

Furthermore, in the inductor component, each of the top surface thickness, the side surface thickness, and the corner thickness may be greater than or equal to 2 μm.

In this case, the insulating property can be more reliably guaranteed.

With the inductor component according to the preferred embodiment of the present disclosure, a situation in which the coil wiring line becomes exposed from the insulating coating film can be suppressed.

Other features, elements, characteristics and advantages of the present disclosure will become more apparent from the following detailed description of preferred embodiments of the present disclosure with reference to the attached drawings.

DETAILED DESCRIPTION

Hereafter, inductor components according to aspects of the present disclosure will be described in detail by referring to illustrated embodiments. Note that the drawings may contain schematic parts and may not reflect the actual dimensions and proportions.

First Embodiment

Configuration

Figure 1A:
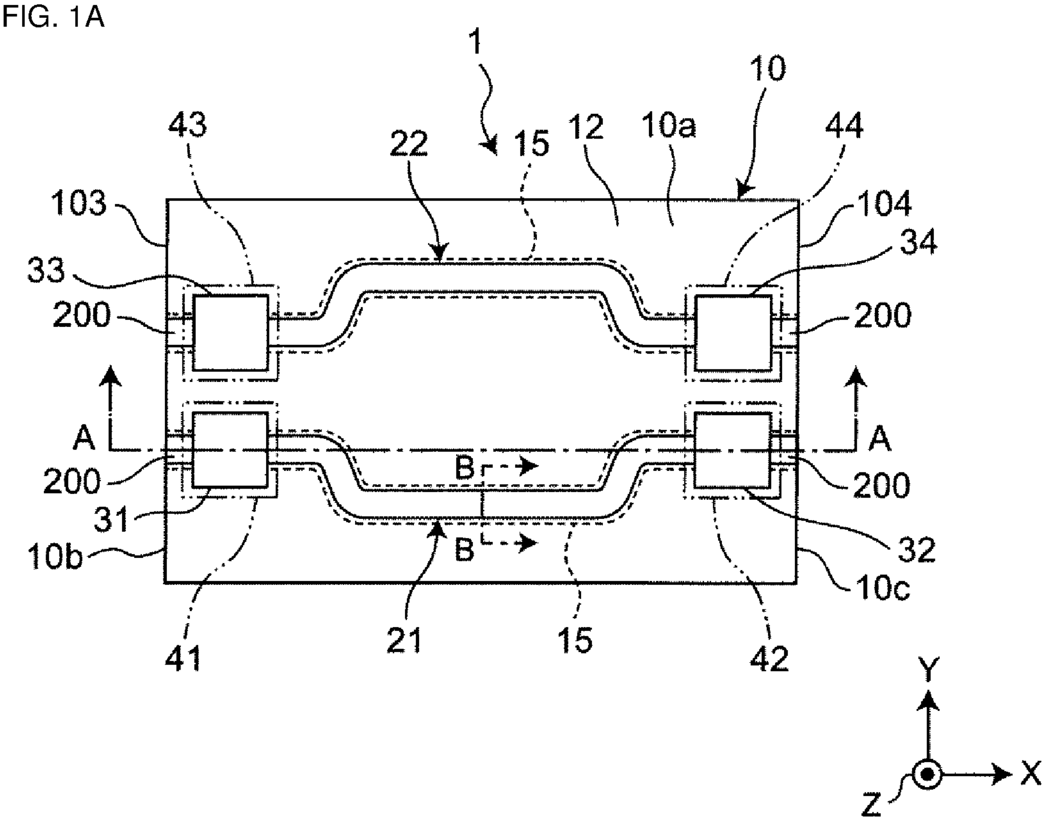
FIG. 1A is a see-through plan view illustrating an inductor component according to a first embodiment.
Figure 1B:
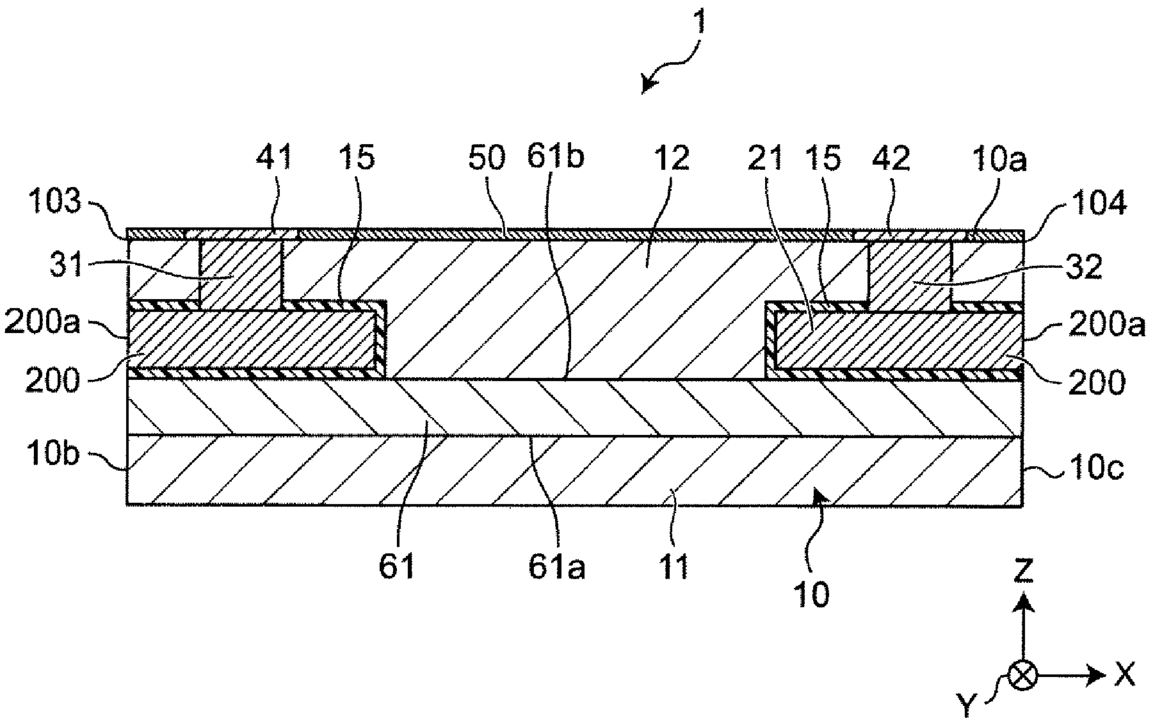
FIG. 1B is a sectional view taken along line A-A in FIG. 1A.

FIG. 1A is a see-through plan view illustrating an inductor component according to a first embodiment. FIG. 1B is a sectional view taken along line A-A in FIG. 1A.

An inductor component 1 is for example a component that is mounted in an electronic appliance such as a personal computer, a DVD player, a digital camera, a TV, a mobile phone, or an in-car electronic appliance and has a substantially rectangular parallelepiped shape on the whole. However, the shape of the inductor component 1 is not particularly limited and the inductor component 1 may instead substantially have a cylindrical or polygonal columnar shape, a truncated cone shape, or a polygonal truncated pyramid shape.

As illustrated in FIGS. 1A and 1B, the inductor component 1 includes an element body 10, a first coil wiring line 21 and a second coil wiring line 22 that are arranged inside the element body 10, an insulating coating film 15 that covers the first coil wiring line 21 and the second coil wiring line 22, a first columnar wiring line 31, a second columnar wiring line 32, a third columnar wiring line 33, and a fourth columnar wiring line 34 that are buried inside the element body 10 so that end surfaces thereof are exposed from a first main surface 10*a* of the element body 10, a first outer terminal 41, a second outer terminal 42, a third outer terminal 43, and a fourth outer terminal 44 that are provided on the first main surface 10*a* of the element body 10, and an insulating film 50 that is provided on the first main surface 10*a* of the element body 10. In the figures, the thickness direction of the inductor component 1 is illustrated as a Z direction with the positive Z direction being the direction toward the upper side and the negative Z direction being the direction toward the lower side. In a plane of the inductor component 1 perpendicular to the Z direction, the length direction of the inductor component 1 is illustrated as an X direction and the width direction of the inductor component 1 is illustrated as a Y direction.

The element body 10 includes an insulating layer 61, a first magnetic layer 11 that is arranged on a lower surface 61*a* of the insulating layer 61, and a second magnetic layer 12 that is arranged on an upper surface 61*b* of the insulating layer 61. The first main surface 10*a* of the element body 10 corresponds to the upper surface of the second magnetic layer 12. Although the element body 10 has a three-layer structure consisting of the insulating layer 61, the first magnetic layer 11, and the second magnetic layer 12, the element body 10 may instead having a one-layer structure consisting of just a magnetic layer or may have a two-layer structure and so forth.

The insulating layer 61 has a substantially layer-like shape with the main surfaces thereof having substantially rectangular shapes, and the thickness of the insulating layer 61 substantially lies in a range from 10 μm to 100 μm, for example. The insulating layer 61 is for example preferably an insulating resin layer such as an epoxy resin or polyimide resin layer that does not contain a base material such as glass cloth from the viewpoint of realizing a low profile, but the insulating layer 61 may instead be for example a sintered body such as a magnetic layer such as a NiZn or MnZn ferrite layer or a non-magnetic layer such as an alumina or glass layer, or may be a resin layer including a base material such as glass epoxy. Furthermore, when the insulating layer 61 is a sintered body, it is possible to ensure that the insulating layer 61 is strong and flat and the workability of a material stacked on the insulating layer 61 is improved. In addition, when the insulating layer 61 is a sintered body, it is preferable that the insulating layer 61 be subjected to a grinding process from the viewpoint of realizing a low profile, and it is particularly preferable that the insulating layer 61 be ground down from the lower side on which nothing is stacked.

The first magnetic layer 11 and the second magnetic layer 12 are magnetic resin layers composed of a resin containing a metal magnetic powder. The resin is for example an organic insulating material consisting of an epoxy resin, bismaleimide, a liquid crystal polymer, polyimide, or the like. The average particle diameter of the metal magnetic powder substantially lies in a range from 0.1 μm to 5 μm, for example. When manufacturing the inductor component 1, the average particle size of the metal magnetic powder can be calculated as a particle size equivalent to an integrated value of 50% in a particle size distribution obtained by laser diffraction and scattering. The metal magnetic powder is for example an FeSi alloy such as FeSiCr, an FeCo alloy, an Fe alloy such as NiFe, or an amorphous alloy of these alloys. The content of the metal magnetic powder preferably substantially lies in a range from 20 to 70 Vol % of the entire magnetic layer. In the case where the average particle diameter of the metal magnetic powder is less than or equal to 5 μm, the direct current superposition characteristic is improved and iron loss at radio frequencies can be reduced by the fine powder. Note that a ferrite magnetic powder such as a NiZn ferrite powder or a MnZn ferrite powder may be used instead of a metal magnetic powder.

The first coil wiring line 21 and the second coil wiring line 22 are arranged so as to be parallel to the first main surface 10*a* of the element body 10. In this way, the first coil wiring line 21 and the second coil wiring line 22 can be formed in a direction parallel to the first main surface 10*a* and a low profile can be realized for the inductor component 1. The first coil wiring line 21 and the second coil wiring line 22 are arranged on the same plane inside the element body 10. More specifically, the first coil wiring line 21 and the second coil wiring line 22 are only formed on the upper side of the insulating layer 61, i.e., the upper surface 61*b* of the insulating layer 61, and are covered by the second magnetic layer 12.

The first and second coil wiring lines 21 and 22 are wound in substantially planar shapes. More specifically, the first and second coil wiring lines 21 and 22 have substantially semi-elliptical arc-like shapes when viewed in the Z direction. In other words, the first and second coil wiring lines 21 and 22 are curved wiring lines that are each wound through approximately half a turn. In addition, the first and second coil wiring lines 21 and 22 each include a straight portion in the middle thereof.

The thicknesses of the first and second coil wiring lines 21 and 22 preferably substantially lie in a range from 40 μm to 120 μm, for example. As an example of the first and second coil wiring lines 21 and 22, the first and second coil wiring lines 21 and 22 may have a thickness of 45 μm, a wiring line width of 40 μm, and an inter-wiring-line spacing of 10 μm. The inter-wiring-line spacing preferably substantially lies in a range from 3 μm to 20 μm.

The first and second coil wiring lines 21 and 22 are composed of a conductive material, and for example are composed of a metal material having a low electrical resistance such as Cu, Ag, or Au. In this embodiment, the inductor component 1 only includes one layer of the first and second coil wiring lines 21 and 22 and a low profile can be realized for the inductor component 1.

A first end and a second end of the first coil wiring line 21 are respectively electrically connected to the first columnar wiring line 31 and the second columnar wiring line 32, which are positioned toward the outside. The first coil wiring line 21 has a substantially curved shape that draws an arc from the first columnar wiring line 31 and the second columnar wiring line 32 toward the center of the inductor component 1. In other words, the first coil wiring line 21 has pad portions at both ends thereof, the pad portions having a larger line width than the spiral-shaped portion of the first coil wiring line 21. The first coil wiring line 21 is directly connected to the first and second columnar wiring lines 31 and 32 at these pad portions.

A first end and a second end of the second coil wiring line 22 are respectively electrically connected to the third columnar wiring line 33 and the fourth columnar wiring line 34, which are positioned toward the outside. The second coil wiring line 22 has a substantially curved shape that draws an arc from the third columnar wiring line 33 and the fourth columnar wiring line 34 toward the center of the inductor component 1.

In this case, in each of the first and second coil wiring lines 21 and 22, the area enclosed by the curve drawn by the first or second coil wiring line 21 or 22 and a straight line connecting the two ends of the first or second coil wiring line 21 or 22 is referred to as the inner diameter part. Here, the inner diameter parts of the first and second coil wiring lines 21 and 22 do not overlap when looking in the Z direction. In addition, the first and second coil wiring lines 21 and 22 are separated from each other at their respective arc-shaped portions.

The wiring lines further extend from the positions where first and second coil wiring lines 21 and 22 are connected to the first to fourth columnar wiring lines 31 to 34 toward the outside of the chip and these wiring lines are exposed outside the chip. In other words, the first and second coil wiring lines 21 and 22 have exposed portions 200 that are exposed to the outside from the side surfaces of the inductor component 1 which are parallel to the stacking direction of layers of the inductor component 1.

These wiring lines are wiring lines that are connected to power supply wiring lines when additional electrolytic plating is performed after forming the shapes of the first and second coil wiring lines 21 and 22 in the process of manufacturing the inductor component 1. These power supply wiring lines allow the additional electrolytic plating to be easily performed on the inductor substrate at a stage before the individual inductor components 1 are separated from each other and enable the distance between the wiring lines to be reduced. In addition, the magnetic coupling between the first and second coil wiring lines 21 and 22 can be increased by decreasing the distance between the wiring lines of the first and second coil wiring lines 21 and 22 by performing the additional electrolytic plating.

Furthermore, since the first and second coil wiring lines 21 and 22 have the exposed portions 200, it is possible to ensure resistance to electrostatic breakdown while the inductor substrate is being processed. The thicknesses of exposed surfaces 200*a* of the exposed portions 200 of the coil wiring lines 21 and 22 preferably substantially lie in a range from 45 μm up to the thicknesses of the coil wiring lines 21 and 22. With this configuration, the thicknesses of the exposed surfaces 200*a* are less than or equal to the thicknesses of the coil wiring lines 21 and 22 and as a result the relative proportions of the magnetic layers 11 and 12 can be increased and the inductance can be improved. Furthermore, the thicknesses of the exposed surfaces 200*a* are greater than or equal to 45 μm and as a result the occurrence of disconnections can be reduced. The exposed surfaces 200*a* are preferably composed of oxide films. Thus, the occurrence of short circuits between the inductor component 1 and adjacent components can be suppressed.

The insulating coating film 15 separately covers the first coil wiring line 21 and the second coil wiring line 22. The insulating coating film 15 ensures that the adjacent first and second coil wiring lines 21 and 22 are insulated from each other. The insulating coating film 15 is composed of an insulating material that does not contain a magnetic material and for example is composed of a resin material containing at least one from among an epoxy resin, a polyimide resin, a phenol resin, and a vinyl ether resin. The insulating coating film 15 is formed by electro-deposition. Furthermore, the insulating coating film 15 may include a non-magnetic filler such as silica, and in this case, the strength, workability, and electrical characteristics of the insulating coating film 15 can be improved.

The first to fourth columnar wiring lines 31 to 34 extend in the Z direction from the coil wiring lines 21 and 22 and penetrate through the inside of the second magnetic layer 12. The first columnar wiring line 31 extends upward from the upper surface of one end of the first coil wiring line 21 and the end surface of the first columnar wiring line 31 is exposed from the first main surface 10*a* of the element body 10. The second columnar wiring line 32 extends upward from the upper surface of the other end of the first coil wiring line 21 and the end surface of the second columnar wiring line 32 is exposed from the first main surface 10*a* of the element body 10.

The third columnar wiring line 33 extends upward from the upper surface of one end of the second coil wiring line 22 and the end surface of the third columnar wiring line 33 is exposed from the first main surface 10*a* of the element body 10. The fourth columnar wiring line 34 extends upward from the upper surface of the other end of the second coil wiring line 22 and the end surface of the fourth columnar wiring line 34 is exposed from the first main surface 10*a* of the element body 10. The first columnar wiring line 31 is located closer to the third columnar wiring line 33 than to the fourth columnar wiring line 34.

Therefore, the first columnar wiring line 31, the second columnar wiring line 32, the third columnar wiring line 33, and the fourth columnar wiring line 34 extend in straight lines from the first coil wiring line 21 and the second coil wiring line 22 to the end surfaces thereof that are exposed from the first main surface 10*a* in a direction perpendicular to the end surfaces. This enables the first outer terminal 41, the second outer terminal 42, the third outer terminal 43, and the fourth outer terminal 44 and the first coil wiring line 21 and the second coil wiring line 22 to be connected to each other across shorter distances and as a result a lower resistance and a higher inductance can be realized for the inductor component 1. The first to fourth columnar wiring lines 31 to 34 are composed of an electrically conductive material and for example are composed of the same material as the coil wiring lines 21 and 22.

The first to fourth outer terminals 41 to 44 are provided on the first main surface 10*a* of the element body 10 (upper surface of second magnetic layer 12). The first to fourth outer terminals 41 to 44 are composed of electrically conductive materials and for example have a three-layer structure consisting of Cu which has low electrical resistance and excellent stress resistance, Ni which has excellent corrosion resistance, and Au which has excellent solder wettability and reliability stacked in this order in a direction toward the outside.

The first outer terminal 41 contacts the end surface of the first columnar wiring line 31 that is exposed from the first main surface 10*a* of the element body 10, and is electrically connected to the first columnar wiring line 31. Thus, the first outer terminal 41 is electrically connected to one end of the first coil wiring line 21. The second outer terminal 42 contacts the end surface of the second columnar wiring line 32 that is exposed from the first main surface 10*a* of the element body 10, and is electrically connected to the second columnar wiring line 32. Thus, the second outer terminal 42 is electrically connected to the other end of the first coil wiring line 21.

Similarly, the third outer terminal 43 contacts an end surface of the third columnar wiring line 33, is electrically connected to the third columnar wiring line 33, and is thus electrically connected to one end of the second coil wiring line 22. The fourth outer terminal 44 contacts an end surface of the fourth columnar wiring line 34, is electrically connected to the fourth columnar wiring line 34, and is thus electrically connected to the other end of the second coil wiring line 22. The first outer terminal 41 is located closer to the third outer terminal 43 than to the fourth outer terminal 44.

In the inductor component 1, the first main surface 10*a* has a first end edge 103 and a second end edge 104 that extend in straight lines corresponding to sides of a rectangular shape. The first end edge 103 and the second end edge 104 are the end edges of the first main surface 10*a* that adjoin a first side surface 10*b* and a second side surface 10*c* of the element body 10. The first outer terminal 41 and the third outer terminal 43 are arranged along the first end edge 103 which is on the side of the element body 10 near the first side surface 10*b* and the second outer terminal 42 and the fourth outer terminal 44 are arranged along the second end edge 104 which is on the side of the element body 10 near the second side surface 10*c*. Note that the first side surface 10*b* and the second side surface 10*c* of the element body 10 are surfaces of the element body 10 that extend along the Y direction and coincide with the first end edge 103 and the second end edge 104 when looking in a direction perpendicular to the first main surface 10*a* of the element body 10. The direction in which the first outer terminal 41 and the third outer terminal 43 are arranged is a direction that connects the center of the first outer terminal 41 and the center of the third outer terminal 43 and the direction in which the second outer terminal 42 and the fourth outer terminal 44 are arranged is a direction that connects the center of the second outer terminal 42 and the center of the fourth outer terminal 44.

The insulating film 50 is provided on the parts of the first main surface 10*a* of the element body 10 where the first to fourth outer terminals 41 to 44 are not provided. However, the insulating film 50 may overlap the first to fourth outer terminals 41 to 44 with the edges of the first to fourth outer terminals 41 to 44 being raised on top of the insulating film 50. The insulating film 50 is for example composed of a resin material having a high electrical insulating property such as an acrylic resin, an epoxy resin, or polyimide. Thus, the degree of insulation between the first to fourth outer terminals 41 to 44 can be improved. Furthermore, the insulating film 50 takes the place of a mask used when forming the patterns of the first to fourth outer terminals 41 to 44 and manufacturing efficiency is improved. In addition, when the metal magnetic powder is exposed from the resin, the insulating film 50 can prevent the metal magnetic powder from being exposed to the outside by covering the exposed metal magnetic powder. Note that the insulating film 50 may contain a filler composed of an insulating material.

Figure 1C:
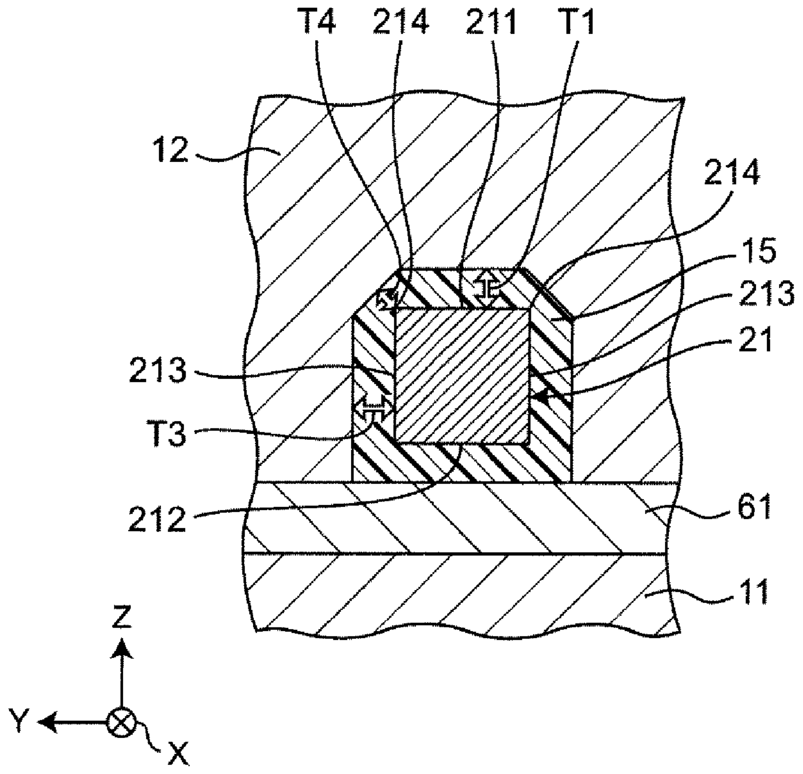
FIG. 1C is a sectional view taken along line B-B in FIG. 1A.

FIG. 1C is a sectional view taken along line B-B in FIG. 1A. As illustrated in FIG. 1C, in a cross section that is perpendicular to the direction in which the first coil wiring line 21 extends, the first coil wiring line 21 has a top surface 211, a bottom surface 212 that faces the top surface 211, left and right side surfaces 213 that are interposed between the top surface 211 and the bottom surface 212, and corners 214 interposed between the top surface 211 and the side surfaces 213. The top surface 211 is positioned in the positive Z direction. The corners 214 are substantially shaped like ridge lines.

In the cross section that is perpendicular to the direction in which the first coil wiring line 21 extends, a top surface thickness T1 of the part of the insulating coating film 15 that covers the top surface 211 of the first coil wiring line 21 and a side surface thickness T3 of the parts of the insulating coating film 15 that cover the side surfaces 213 of the first coil wiring line 21 are less than or equal to 10 μm, and a corner thickness T4 of the parts of the insulating coating film 15 that cover the corners 214 interposed between the top surface 211 and the side surfaces 213 of the first coil wiring line 21 is greater than or equal to half of at least one out of the top surface thickness T1 and the side surface thickness T3. The thicknesses T1, T3, and T4 each represent the minimum thickness. As a method of measuring the thicknesses, the thicknesses are measured in a cross section that passes through the center of the inductor component 1, that is, a YZ cross section in the center of the inductor component 1 in the X direction in this embodiment. Note that the insulating coating film 15 that covers the second coil wiring line 22 has the same configuration and therefore description thereof is omitted.

Thus, the top surface thickness T1 and the side surface thickness T3 of the insulating coating film 15 are less than or equal to 10 μm, and therefore the thickness of the insulating coating film 15 can be reduced, and consequently, the inductor component 1 can be reduced in size or the inductance can be improved by increasing the size of the region occupied by the magnetic layer 12.

Furthermore, since the corner thickness T4 of the insulating coating film 15 is greater than or equal to half of at least one out of the top surface thickness T1 and the side surface thickness T3, the difference between the corner thickness T4 and at least one out of the top surface thickness T1 and the side surface thickness T3 can be reduced, and as a result, the situation in which the parts of the insulating coating film 15 covering the corners 214 of the first coil wiring line 21 become thinner due to the surface tension generated during heat curing shrinkage and the corners 214 of the first coil wiring line 21 end up becoming exposed from the insulating coating film 15 can be suppressed.

In short, the inventors of the present application were successful in forming the thickness of the part of the insulating resin layer covering the top surface of the coil wiring line so as to be less than 10 μm in the inductor component of the related art, but discovered that there is a risk of the coil wiring line becoming exposed from the insulating resin layer in this case. With further investigations, the inventors of the present application found that the corners of the first coil wiring line become exposed from the insulating coating film. Accordingly, the inventors of the present application focused on the thickness of the parts of the insulating coating film that cover the corners of the first coil wiring line and were able to prevent the corners of the first coil wiring line from becoming exposed from the insulating coating film by making the corner thickness T4 be greater than or equal to half of at least one out of the top surface thickness T1 and the side surface thickness T3.

Note that the top surface thickness T1 and the side surface thickness T3 may be identical to each other, which makes it is easier to control the thicknesses. Alternatively, the top surface thickness T1 and the side surface thickness T3 may be different from each other and the thicknesses can be adjusted in accordance with the function of the device.

The corner thickness T4 may be identical to the top surface thickness T1 and the side surface thickness T3, which makes it is easier to control the thickness. Alternatively, the corner thickness T4 may be smaller than the top surface thickness T1 and the side surface thickness T3, which makes it possible to further decrease the size (thickness) of the inductor component 1. Alternatively, the corner thickness T4 may be larger than the top surface thickness T1 and the side surface thickness T3, which makes it possible to even more reliably prevent a situation in which the corners 214 of the first coil wiring line 21 become exposed from the insulating coating film 15.

The corner thickness T4 is preferably greater than or equal to half of the smaller thickness out of the top surface thickness T1 and the side surface thickness T3. As a result, the thickness of the insulating coating film 15 can be made even smaller.

The corner thickness T4 is preferably smaller than the larger thickness out of the top surface thickness T1 and the side surface thickness T3. As a result, there is no need to make the corner thickness T4 excessively large and the inductor component 1 can be efficiently manufactured.

The top surface thickness T1, the side surface thickness T3, and the corner thickness T4 are preferably each greater than or equal to 2 μm. As a result, the insulating property can be more reliably guaranteed.

In this embodiment, the cross-sectional shape of the first coil wiring line is a substantially square shape and the shape of each corner 214 is that of an intersection where the top surface 211 and the corresponding side surface 213 intersect at around 90° and therefore the corner thickness T4 tends to be comparatively small. As an example, the top surface thickness T1 may be 4 μm, the side surface thickness T3 may be 4 μm, and the corner thickness T4 may be 2 μm.

Manufacturing Method

Next, a method of manufacturing the inductor component 1 will be described.

First, a seed layer is formed on the top surface 61*b* of the insulating layer 61 by performing sputtering, electroless plating, or the like. Next, a resist in which through holes have been formed at the places where the coil wiring lines 21 and 22 are to be located on the seed layer is arranged on the seed layer and the wiring lines are formed in the through holes of the resist by performing electrolytic plating. Formation of the coil wiring lines 21 and 22 is completed by removing the resist and the unwanted parts of the seed layer.

Then, the insulating coating film 15 is formed on the coil wiring lines 21 and 22 using an insulation electrodeposition method. The thickness of the insulating coating film 15 can be made to be less than or equal to 10 μm by forming the insulating coating film 15 using electrodeposition in this way. At this time, the insulating coating film 15 is formed so that the corner thickness T4 of the parts of the insulating coating film 15 that cover the corners 214 located between the top surface 211 and the side surfaces 213 of the coil wiring lines 21 and 22 is greater than or equal to half of at least one out of the top surface thickness T1 and the side surface thickness T3. Thus, a situation in which the coil wiring lines 21 and 22 are exposed from the insulating coating film 15 can be suppressed. In addition, openings are formed at parts of the insulating coating film 15 above the coil wiring lines 21 and 22 using etching or a laser, and then the columnar wiring lines 31 to 34 that extend upward from the coil wiring lines 21 and 22 are formed.

After that, the second magnetic layer 12 is formed on the insulating layer 61 so as to cover the coil wiring lines 21 and 22 and the columnar wiring lines 31 to 34 by pressure bonding a magnetic sheet composed of a magnetic material on the upper surface 61*b* of the insulating layer 61. The end surfaces of the columnar wiring lines 31 to 34 are exposed by subjecting the second magnetic layer 12 to grinding.

After that, the insulating film 50 is formed on the upper surface of the second magnetic layer 12. Through holes through which the end surfaces of the columnar wiring lines 31 to 34 and the second magnetic layer 12 are exposed are formed in regions of the insulating film 50 where the outer terminals will be formed.

After that, part of the insulating layer 61 is removed by performing grinding. At this time, the insulating layer 61 is not completely removed, and part of the insulating layer 61 is left intact. The first magnetic layer 11 is formed by pressure bonding a magnetic sheet composed of a magnetic material to the lower surface 61*a* on the ground down side of the insulating layer 61 and then grinding down the magnetic sheet to a suitable thickness.

After that, the outer terminals 41 to 44 are formed by forming metal films that grow from the columnar wiring lines 31 to 34 inside the through holes of the insulating film 50 by performing electroless plating.

Second Embodiment

Figure 2:
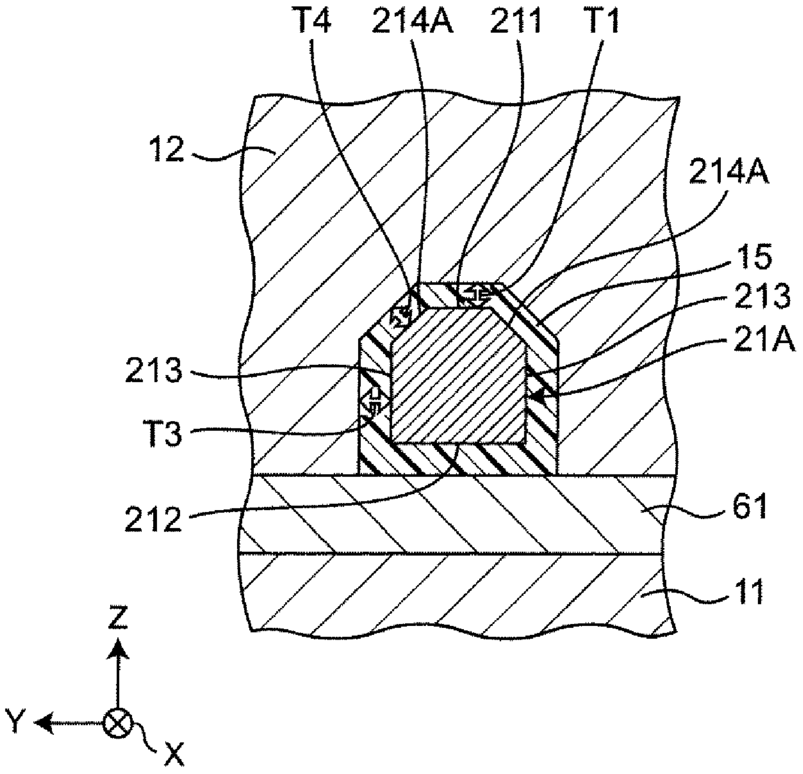
FIG. 2 is a sectional view illustrating an inductor component according to a second embodiment.

FIG. 2 is a sectional view illustrating an inductor component according to a second embodiment. The second embodiment differs from the first embodiment with respect to the shape of corners of the coil wiring lines. This difference will be described below. The rest of the configuration is the same as in the first embodiment, and parts that are the same as in the first embodiment are denoted by the same symbols and description thereof is omitted.

As illustrated in FIG. 2, in an inductor component of the second embodiment, the corners 214A of a first coil wiring line 21A are each substantially shaped like a chamfered surface. The term "chamfered surface" used in the present specification does not include a convexly-curved surface.

Specifically, corners 214A having substantially tapered shapes are located between the top surface 211 and the side surfaces 213 of the first coil wiring line 21A. As a result, it is easy to realize a structure in which the corner thickness T4 is greater than or equal to half of at least one out of the top surface thickness T1 and the side surface thickness T3. Note that the corners of the second coil wiring line have the same configuration and therefore description thereof is omitted.

In particular, in this embodiment, since the corners 214A are each substantially shaped like a chamfered surface, the top surface thickness T1 and side surface thickness T3 and the corner thickness T4 can be made close to each other. Therefore, as an example, the top surface thickness T1 may be 2 μm, the side surface thickness T3 may be 2 μm, and the corner thickness T4 may be 2 μm. Therefore, the top surface thickness T1 and the side surface thickness T3 can be made smaller compared with the example of the first embodiment.

Figure 3A:
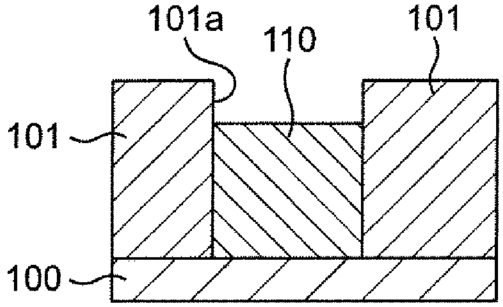
FIG. 3A is an explanatory diagram for explaining a method of manufacturing a first coil wiring line.

Next, a method of manufacturing the first coil wiring line 21A will be described. As illustrated in FIG. 3A, a first resist 101 is provided on a seed layer 100, the first resist 101 is patterned using photolithography to form a through hole 101*a*, and a metal film 110 is formed on the seed layer 100 inside the through hole 101*a* using a plating process.

Figure 3B:
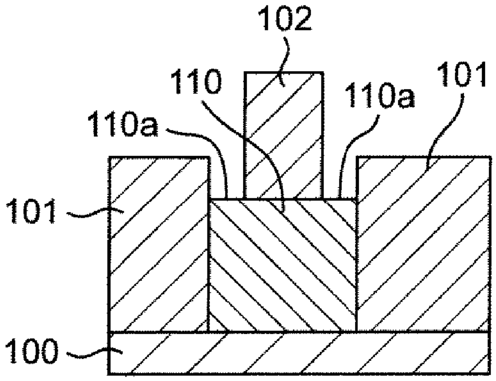
FIG. 3B is an explanatory diagram for explaining a method of manufacturing a first coil wiring line.

As illustrated in FIG. 3B, a second resist 102 is provided on the metal film 110 and the second resist 102 is patterned using photolithography so as to expose end portions 110*a* of the upper surface of the metal film 110 from the second resist 102.

Figure 3C:
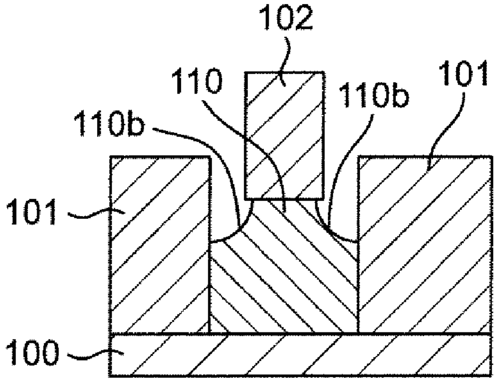
FIG. 3C is an explanatory diagram for explaining a method of manufacturing a first coil wiring line.

As illustrated in FIG. 3C, corners 110*b* of the metal film 110 are formed into substantially chamfered shaped surfaces by removing parts of the end portions 110*a* of the metal film 110 by performing etching. Thus, the first coil wiring line 21A having substantially chamfered surface shaped corners 214A can be manufactured. In this case, it is also possible to make the corners 214A be substantially shaped like concave surfaces, as illustrated in FIG. 3C, by adjusting the etching process time and so forth, and this also makes it easier to secure the corner thickness T4 of the insulating coating film 15.

Third Embodiment

Figure 4:
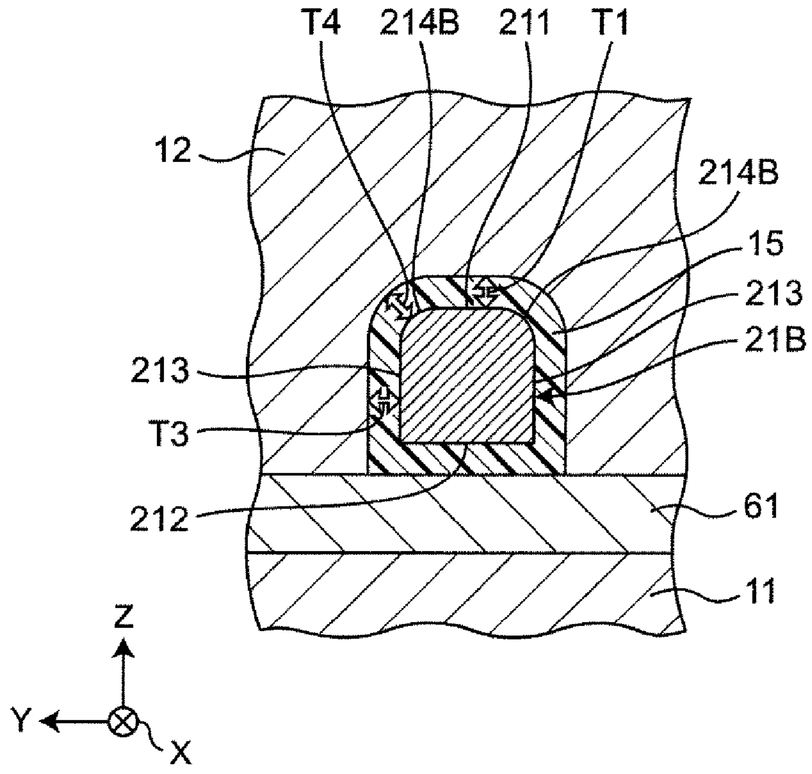
FIG. 4 is a sectional view illustrating an inductor component according to a third embodiment.

FIG. 4 is a sectional view illustrating an inductor component according to a third embodiment. The third embodiment differs from the first embodiment with respect to the shape of corners of the coil wiring lines. This difference will be described below. The rest of the configuration is the same as in the first embodiment, and parts that are the same as in the first embodiment are denoted by the same symbols and description thereof is omitted.

As illustrated in FIG. 4, in an inductor component of the third embodiment, corners 214B of a first coil wiring line 21B are substantially shaped like convexly-curved surfaces. Specifically, substantially curved corners 214B are located between the top surface 211 and the side surfaces 213 of the first coil wiring line 21B. As a result, it is easy to realize a structure in which the corner thickness T4 is greater than or equal to half of at least one out of the top surface thickness T1 and the side surface thickness T3. Note that the corners of the second coil wiring line have the same configuration and therefore description thereof is omitted.

In this embodiment, since the corners 214B are substantially shaped like convexly-curved surfaces, the top surface thickness T1 and the side surface thickness T3 and the corner thickness T4 can be made close to each other. Therefore, as an example, the top surface thickness T1 may be 2 μm, the side surface thickness T3 may be 2 μm, and the corner thickness T4 may be 2 μm. Therefore, the top surface thickness T1 and the side surface thickness T3 can be made smaller compared with the example of the first embodiment.

Figure 5A:
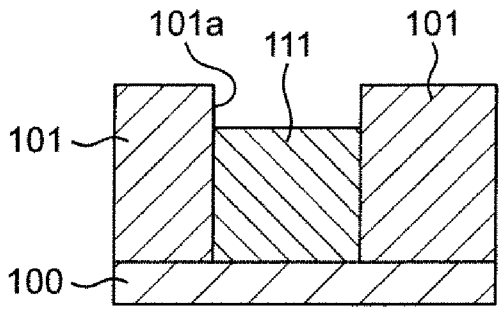
FIG. 5A is an explanatory diagram for explaining a method of manufacturing a first coil wiring line.

Next, a method of manufacturing the first coil wiring line 21B will be described. As illustrated in FIG. 5A, a first resist 101 is provided on a seed layer 100, the first resist 101 is patterned using photolithography to form a through hole 101*a*, and a first metal film 111 is formed on the seed layer 100 inside the through hole 101*a* using a plating process.

Figure 5B:
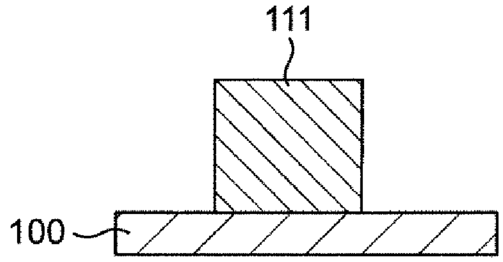
FIG. 5B is an explanatory diagram for explaining a method of manufacturing a first coil wiring line.
Figure 5C:
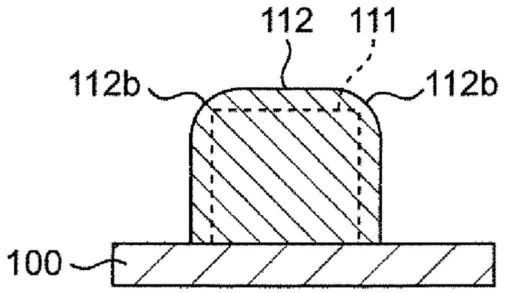
FIG. 5C is an explanatory diagram for explaining a method of manufacturing a first coil wiring line.

As illustrated in FIG. 5B, the first resist 101 is removed so as to expose the first metal film 111, and as illustrated in FIG. 5C, the first metal film 111 subjected to further plating (extra plating processing) to form a second metal film 112. At this time, corners 112*b* of the metal film 112 are formed so as to be substantially shaped like convexly-curved surfaces. Thus, the first coil wiring line 21B that has substantially convexly-curved-surface-shaped corners 214B can be manufactured.

The present disclosure is not limited to the above-described embodiments and design changes can be made within a range that does not depart from the gist of the present disclosure. For example, the characteristic features of the first to third embodiments may be combined with each other in various ways.

In the above-described embodiments, two coil wiring lines, namely, the first coil wiring line and the second coil wiring line, are arranged inside the element body, but one or three or more coil wiring lines may instead be arranged inside the element body, and in this case, each coil wiring line is covered with an insulating coating film.

In the above-described embodiments, the number of turns of each coil wiring line is less than one turn, but the number of turns of each coil wiring line may exceed one turn. In this case, every turn of the coil wiring lines is covered with an insulating coating film. Therefore, the size of a region occupied by a magnetic layer between adjacent turns of a coil wiring line can be increased. In addition, the total number of coil wiring lines is not limited to one layer and there may be two or more layers in a multilayer configuration. In particular, the term "coil wiring line" used in the present specification refers to a coil wiring line that gives inductance to an inductor component by generating magnetic flux in a magnetic layer when a current flows and there are no particular restrictions on the structure, shape, material, and so forth of the coil wiring lines. Specifically, the coil wiring lines are not limited to forming a spiral curve extending along a plane as described in the embodiments and various known wiring line shapes such as meandering wiring lines can be used.

The columnar wiring lines are not covered by an insulating coating film in the above-described embodiments, but the columnar wiring lines may be covered by an insulating coating film. Furthermore, although the shape of the columnar wiring lines is a substantially rectangular shape when looking in the Z direction, the shape may instead be a substantially circular, elliptical, or oval shape.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

an element body including a magnetic layer that includes a magnetic powder and a resin that contains the magnetic powder;

a coil wiring line that is arranged inside the element body; and an insulating coating film that covers the coil wiring line and is without a magnetic material;

wherein in a cross section that is perpendicular to a direction in which the coil wiring line extends, a top surface thickness of a part of the insulating coating film that covers a top surface of the coil wiring line and a side surface thickness of parts of the insulating coating film that cover side surfaces of the coil wiring line are less than or equal to 10 μm, and a corner thickness of parts of the insulating coating film that cover corners of the coil wiring line interposed between the top surface and the side surfaces of the coil wiring line is greater than or equal to half of at least one of the top surface thickness and the side surface thickness, and the insulating coating film has an outer top surface, outer corner surfaces, and outer side surfaces in direct contact with the magnetic layer, and the insulating coating film has an outer bottom surface in direct contact with an insulating layer.

2. The inductor component according to claim 1, wherein the corner thickness is greater than or equal to half of the smaller thickness out of the top surface thickness and the side surface thickness.

3. The inductor component according to claim 2, wherein the corner thickness is smaller than the larger thickness out of the top surface thickness and the side surface thickness.

4. The inductor component according to claim 3, wherein the corners are each substantially shaped like a chamfered surface.

5. The inductor component according to claim 3, wherein the corners are each substantially shaped like a convexly-curved surface.

6. The inductor component according to claim 3, wherein each of the top surface thickness, the side surface thickness, and the corner thickness is greater than or equal to 2 μm.

7. The inductor component according to claim 2, wherein the corners are each substantially shaped like a chamfered surface.

8. The inductor component according to claim 7, wherein each of the top surface thickness, the side surface thickness, and the corner thickness is greater than or equal to 2 μm.

9. The inductor component according to claim 2, wherein the corners are each substantially shaped like a convexly-curved surface.

10. The inductor component according to claim 2, wherein each of the top surface thickness, the side surface thickness, and the corner thickness is greater than or equal to 2 μm.

11. The inductor component according to claim 1, wherein the corner thickness is smaller than the larger thickness out of the top surface thickness and the side surface thickness.

12. The inductor component according to claim 11, wherein the corners are each substantially shaped like a chamfered surface.

13. The inductor component according to claim 11, wherein the corners are each substantially shaped like a convexly-curved surface.

14. The inductor component according to claim 11, wherein each of the top surface thickness, the side surface thickness, and the corner thickness is greater than or equal to 2 μm.

15. The inductor component according to claim 1, wherein the corners are each substantially shaped like a chamfered surface.

16. The inductor component according to claim 15, wherein each of the top surface thickness, the side surface thickness, and the corner thickness is greater than or equal to 2 μm.

17. The inductor component according to claim 1, wherein the corners are each substantially shaped like a convexly-curved surface.

18. The inductor component according to claim 17, wherein each of the top surface thickness, the side surface thickness, and the corner thickness is greater than or equal to 2 μm.

19. The inductor component according to claim 1, wherein each of the top surface thickness, the side surface thickness, and the corner thickness is greater than or equal to 2 μm.

20. The inductor component according to claim 1, wherein a number of sides of the insulating coating film is greater than a number of sides of the coil wiring line.

* * * * *